United States Patent
Fang et al.

(10) Patent No.: US 9,058,112 B2
(45) Date of Patent: Jun. 16, 2015

(54) RETRIEVING DATA IN A STORAGE SYSTEM USING THIN PROVISIONING

(75) Inventors: Min Fang, Shanghai (CN); Hui X. Gu, Shanghai (CN); Xiao Yan Li, Shanghai (CN); Fan G. Zeng, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 554 days.

(21) Appl. No.: 13/407,121

(22) Filed: Feb. 28, 2012

(65) Prior Publication Data

US 2012/0221828 A1    Aug. 30, 2012

(51) Int. Cl.
*G06F 12/06*   (2006.01)
*G06F 3/06*    (2006.01)
*G06F 17/30*   (2006.01)

(52) U.S. Cl.
CPC ............ *G06F 3/0611* (2013.01); *G06F 3/0608* (2013.01); *G06F 3/0643* (2013.01); *G06F 3/0665* (2013.01); *G06F 3/067* (2013.01); *G06F 17/30961* (2013.01)

(58) Field of Classification Search
CPC .................. G06F 17/30864; G06F 17/30961; G06F 17/30914; G06F 17/2247; G06F 17/30371; G06F 17/30; G06F 17/30902; G06F 17/30911; G06F 11/3452; G06F 11/3409; G06F 11/3466; G06F 3/0643; G06F 3/0665; G06F 2201/86; G06F 2201/81; G06F 2201/865; G06F 2201/88; G06F 2212/1032; G06F 2212/1044; G06F 7/00
USPC .................. 711/E12.001, E12.002, E12.017, 711/E12.078, 1, 100, 103, 154, 165, 206
See application file for complete search history.

(56) References Cited

U.S. PATENT DOCUMENTS

| | | | |
|---|---|---|---|
| 7,743,203 B2 * | 6/2010 | France | 711/103 |
| 7,802,063 B1 | 9/2010 | Chatterjee et al. | |
| 8,533,158 B1 * | 9/2013 | Rao | 707/646 |
| 2007/0239793 A1 | 10/2007 | Tyrrell et al. | |
| 2009/0177857 A1 | 7/2009 | Butterworth et al. | |
| 2010/0049902 A1 | 2/2010 | Kakihara et al. | |
| 2010/0235569 A1 | 9/2010 | Nishimoto et al. | |
| 2010/0274879 A1 * | 10/2010 | Wolfe | 709/223 |

(Continued)

FOREIGN PATENT DOCUMENTS

| CN | 101809551 A | 8/2010 |
|---|---|---|
| EP | 2153332 A1 | 2/2010 |
| EP | 2219106 A2 | 8/2010 |

(Continued)

OTHER PUBLICATIONS

IBM Corporation, "IBMStorwize V7000Midrange Disk System Data Sheet," Armonk, New York, 2010.

*Primary Examiner* — Yong Choe
*Assistant Examiner* — Edward Waddy, Jr.
(74) *Attorney, Agent, or Firm* — Griffiths & Seaton PLLC

(57) ABSTRACT

The invention relates to retrieving data from a storage system. One embodiment of the invention comprises receiving a write operation, establishing a correspondence relationship between a logic block address and a physical block address of the write operation, and determining whether a valid data percentage in a mapping table is greater than a predetermined threshold after the correspondence relationship is added in stored metadata. In response to the valid data percentage being less than the predetermined threshold, the embodiment adds the correspondence relationship to a B-tree data structure of stored metadata.

18 Claims, 3 Drawing Sheets

(56) References Cited

U.S. PATENT DOCUMENTS

| | | | |
|---|---|---|---|
| 2011/0060779 A1* | 3/2011 | Lemar et al. | 707/830 |
| 2011/0066808 A1* | 3/2011 | Flynn et al. | 711/118 |
| 2011/0213816 A1* | 9/2011 | Doshi et al. | 707/827 |
| 2012/0143919 A1* | 6/2012 | Idicula et al. | 707/796 |

FOREIGN PATENT DOCUMENTS

| | | |
|---|---|---|
| WO | 2008133812 A1 | 11/2008 |

* cited by examiner

RETRIEVING DATA IN A STORAGE SYSTEM USING THIN PROVISIONING

BACKGROUND

Embodiments of the invention relate generally to data storage systems, and more particularly to a method and apparatus for retrieving data from a data storage system.

Data have become one of most important resources for an enterprise. The data universe is forecast to reach 35.2 ZBytes in 2020 (1 ZByte=1 million PetaBytes), 44 times the estimated storage size in 2009. The data amount grows almost exponentially, which causes an enterprise to constantly purchase a considerable number of storage devices to satisfy the increasing demand for storage. However, studies show that the utilization efficiency of storage in an enterprise is often less than 50%, so the investment return rate of storage is at a quite low level.

In order to satisfy the soaring demand for data storage, solutions have been proposed to reduce the space occupied by data, simplify the storage management, and utilize existing resources to the utmost so as to reduce costs. These solutions may involve storage resource consolidation, dynamic configuration in storage capacity, curtailing storage capacities, information life cycle management, and reducing energy consumption.

One important technique for managing data storage is thin provisioning. A core principle of thin provisioning is to present to an operating system that it has access to a storage system with a very large storage space, while the actual physical storage space is not so large. A storage system that uses thin provisioning technique does not allocate too much space to an application all at once. Instead, it will allocate less space to the application in multiple times based on the volume actually required by this application. When the allocated volume space is not enough with the increase of the data generated by this application, the system will supplement some storage space from a backend storage pool.

However, it takes longer time to retrieve data from a storage system that uses thin provisioning; thus impacting the performance of the system. It is therefore desirable to reduce the data retrieving time for a storage system that uses a thin provisioning technology.

BRIEF SUMMARY

Embodiments of the invention relate to a method and apparatus for retrieving data in a storage system using a thin provisioning technology. The method and system of the invention may reduce the IO access time of the storage system and thereby improve the IO access efficiency.

One aspect of the invention concerns a method of retrieving data in a storage system that may comprise receiving a write operation including a correspondence relationship between a logic block address and a physical block address of the write operation, wherein the correspondence relationship is added to stored metadata; determining whether a valid data percentage is greater than a predetermined threshold; in response to the valid data percentage being not greater than the predetermined threshold, adding the correspondence relationship into a B-tree data structure of the stored metadata; in response to the valid data percentage being greater than the predetermined threshold, determining whether the stored metadata are stored in the B-tree data structure; in response to the stored metadata being stored in the B-tree data structure, storing the metadata that are stored in the B-tree data structure into the mapping table; and writing at the physical block address data that the write operation requires to write.

Another aspect of the invention concerns an apparatus for retrieving data in a storage system. The apparatus comprises a receiving component configured to receive a write operation request; a correspondence relationship establishing component configured to establish, for the write operation request, a corresponding relationship between a logic block address and a physical block address of the write operation; a first determining component configured to determine whether a valid data percentage calculated using a mapping table is greater than a predetermined threshold; a B-tree index correspondence relationship adding component configured to, in response to the valid data percentage being not greater than the predetermined threshold, add the correspondence relationship in a B-tree data structure of the stored metadata; a second determining component configured to, in response to the valid data percentage being greater than the predetermined threshold, determine whether the stored metadata are stored in the B-tree data structure; a converting component configured to, in response to the stored metadata being stored in the B-tree structure, store the metadata in a mapping table including the correspondence relationship; and a writing component configured to write at the physical block address data that the write operation request requires to write.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE SEVERAL VIEWS OF THE DRAWINGS

The above and other objectives, features and advantages of the present invention will become more apparent through more detailed description of exemplary embodiments of the present invention as illustrated in the drawings, where like reference signs typically represent the same components in the preferred embodiments of the present invention.

DETAILED DESCRIPTION

Figure 1:
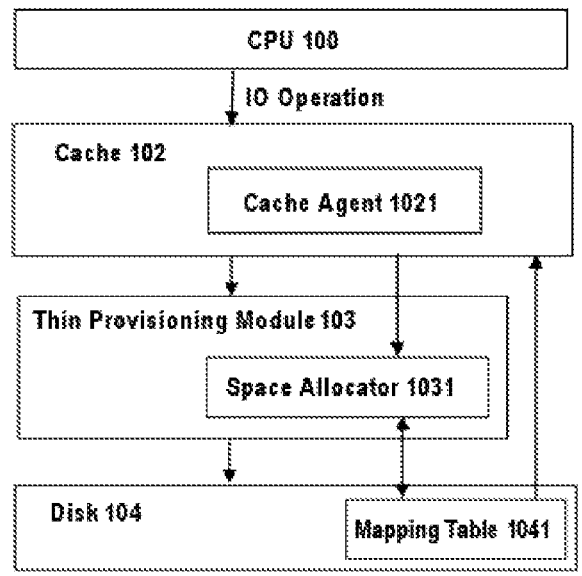
FIG. 1 illustrates a hierarchical structure in a thin provisioning data storage system.

Hereinafter, exemplary embodiments of the present invention will be described in more detail with reference to the accompanying drawings where the preferred embodiments of the present invention are illustrated. However, the present invention may be implemented in various manners and should not be understood as limited by the embodiments depicted herein. On the contrary, these embodiments are provided to make the present invention much clearer and more complete and to completely communicate the scope of the present invention to the skilled in the art.

In order to satisfy the increasing demand for data storage, the concept of "Space Efficient" has been proposed to reduce the space occupied by data, simplify storage management, and utilize the existing resources to reduce costs. Space Efficient is mainly implemented based on five basic strategies: storage resource consolidation, dynamic configuration in storage capacity, curtailing storage capacities, information life cycle management, and reducing energy consumption.

One important technique for Space Efficiency strategies is thin provisioning. In thin provisioning, an operating system may have access to a very large storage space when the actual physical storage space is not so large. In a traditional storage system, in order to ensure that the storage capacity is enough for use within a certain period of time, a user often deploys sufficient physical storage space more than the actual need. However, in the actual use process, especially in an initial stage, the deployed storage capacity is usually insufficiently used. For example, a small and medium enterprise plans to use a storage capacity of 2 TB, with the first year using 50 GB, the second year reaching 200 GB, the third year reaching 900 GB, the fourth year reaching 12 TB, and the fifth year reaching 2 TB. In the conventional storage system, it is required to deploy a storage space of 2 TB all at once, which needs a very high investment, but the utilization rate of the storage space is very low. In contrast, a storage system that uses thin provisioning technique will not allocate too much space to an application all at once. Instead, it will allocate less space to the application in multiple times based on the volume actually required by this application. When the allocated volume space is not enough for the increase of the data generated by this application, the system will supplement some storage space from a backend storage pool. Therefore, the user may only configure 50 GB actual physical storage space in the first year, and then increase another 150 GB physical storage space in the second year, and so forth. By using this technique, the hierarchical structure of the user's storage system does not need to be changed. Besides, it may further reduce excessive configuration, improve the storage space utilization efficiency to a greater extent, reduce the initial investment costs, reduce the total power consumption, and thereby reduce the operating costs of the enterprise. Currently, most high-end disk array products support this technology.

The above function is enabled because the organization manner of the storage system that uses thin provisioning is different from that of the conventional storage system data, which causes their data retrieving manners to be different.

Current storage systems generally use a virtual storage structure, namely virtualizing an actual physical hard disk into a plurality of volumes that may be deemed as a plurality of virtual disks. For example, two 3 G physical hard disks may be virtualized into 3 2 G virtual disks by the host, where 3 disk identifiers are available to the host; each virtual disk may support the thin provisioning technology. When the storage system allocates the storage space, the allocation unit is Grain, while the unit of Grain may be 32 K, 64 K, 128 K, or 256 K, etc. Technically, either the virtualized storage system or the actual physical storage system may support the thin provisioning technology.

FIG. 1 illustrates an existing hierarchical structure in the thin provisioning technology. The input/output (I/O) operation comprising a write operation and read operation from a CPU 100 is obtained by a cache agent 1021 in a cache module 102; the cache agent 1021 in the cache module 102 is mainly for improving the IO speed. Some frequently used custom data may be placed in the cache, such that when it is required to access data, the cache is first accessed. If the data exist in the cache, it is called a cache hit. It would be unnecessary to access the data in the low-speed memory (for example, devices used for storing user data in a storage system, such as a hard disk, a magnetic tape, etc.), and thus improving the access speed. If the cache is missed, the address of the data that is subjected to IO operation should be re-mapped for the cache module 102 to obtain the physical address of the data and access the address of the low-speed memory (or virtual disk) 104.

Referring to FIG. 1, a write operation of the CPU enters into a space allocator 1031 of a thin provisioning module 103 through a cache agent 1021 in a cache module 102. The space allocator allocates a physical block address to the write operation based on the logic block address of the write operation, and then modifies a mapping table 1041 of the metadata in a low-speed storage 104, where the mapping relationship between the allocated physical block address and the logic block address of the write operation is established in the metadata. Finally, data related to the write operation are written into the allocated physical block address, where the size of the address space that is allocated for one write operation is one Grain. In contrast, a read operation of the CPU enters into a space allocator 1031 of a thin provisioning module 103 through a cache agent 1021 in a cache module 102. The space allocator, based on a logic block address of the read operation, queries a physical block address corresponding to the logic block address in a mapping table of metadata, and then reads out the data from the physical block address of a low-speed storage 104.

Accordingly, each IO operation has to access the low-speed memory twice, one for obtaining the address mapping relationship in the mapping table of metadata and the other for accessing client data, which results in a long IO operation time. The performance for a virtual disk configured with the thin provisioning technology is about one half of the performance of a disk configured with the conventional storage technology in case of a cache miss occurring to a random read operation. The performance for a virtual disk configured with the thin provisioning technology is about one third of the performance of a disk configured with the conventional storage technology in case of a cache miss occurring to a random write operation. It is thus desirable to improve the I/O performance of a storage system configured with the thin provisioning.

In a thin provisioning implementation, an actual physical storage space expression is typically less than or equal to the storage space allocated by the CPU. The data organization manner in this storage technology is different from that in a typical storage technology, which results in that the data index manner in the thin provisioning technology is also different from a typical storage index. In a typical storage technology, because the actual physical storage space is equal to the storage space expression allocated by the CPU, the logic space and the physical storage space may be deemed as exact correspondence when the CPU performs the read/write operation. Thus, it is not necessary to store their mapping relationship. However, metadata in thin provisioning are stored in the low-speed memory for mapping the logic address of the IO operation of the CPU to the corresponding storage address. Thus, a low-speed storage (or virtual disk) that supports the thin provisioning technology typically comprises metadata and user data. The metadata are stored in a B-tree data structure.

Figure 2:
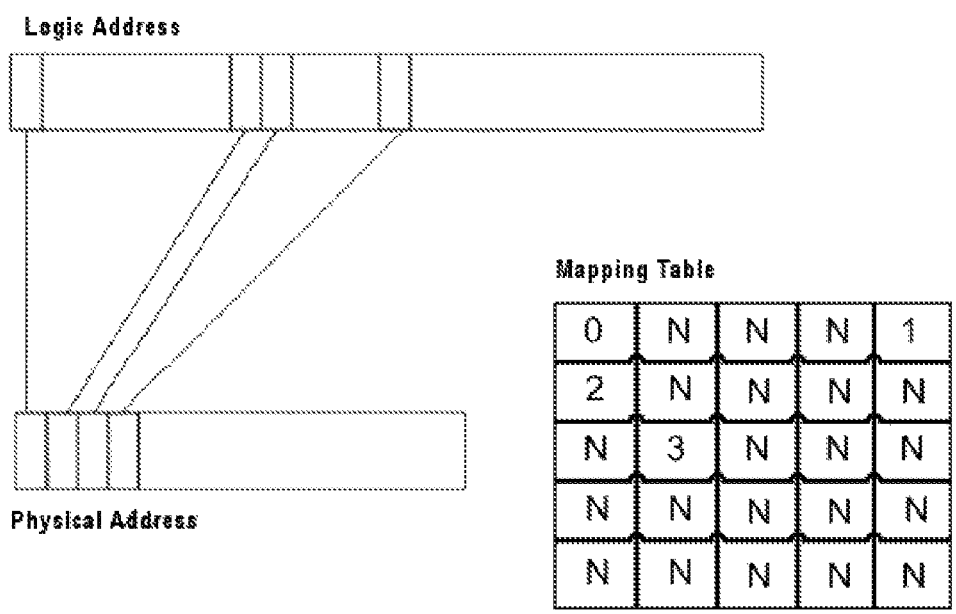
FIG. 2 illustrates a structure of a mapping table and data therein.

The present invention provides a new data structure mapping table of metadata. The meaning of the data structure in the mapping table is illustrated in FIG. 2 which shows a structure of a mapping table of the metadata and meanings expressed by the data therein. This mapping table appears like a matrix. It demonstrates mappings from logic block addresses to physical bock addresses in the form of the first row, the second row, . . . , and the fifth row. For example, the mapping table in FIG. 1 demonstrates 25 mapping relationships between the logic block addresses and physical block addresses. Specifically, in the mapping table, data 0 represents that the $0^{th}$ (the $0^{th}$ data counted from the first row) grain (allocation unit) corresponds to the $0^{th}$ physical block, data 1 example and may be different in other cases. When the percentage of valid data is less than a threshold, the B-tree data structure storing metadata saves more storage space; and when the percentage of valid data is greater than the threshold, storing the mapping table saves more storage space.

TABLE 1

Storage Space Required By the Mapping Table and the B-Tree Corresponding To Different Valid Data Percentages

| Storage Space Required by the Mapping table (MB) | Percentage of Valid Data | Storage Space Occupied by Valid Data (MB) | Number of Leaf Nodes of B-tree | Number of Non-leaf Nodes of B-tree | Storage Space Required by B-tree (MB) |
|---|---|---|---|---|---|
| 256 | 50% | 128 | 32768 | 65 | 256 |
| 256 | 30% | 76 | 19456 | 39 | 152 |
| 256 | 10% | 22 | 6553 | 13 | 51 | represents that the fourth (the fourth data counted from the first row) grain corresponds to the first physical block, and data 2 represents that the fifth (the fifth data counted from the first row) grain corresponds to the second physical block.

To store metadata using the data structure in the mapping table of metadata, the used storage space satisfies the following equation (every real address needs 8 bytes to store):

The storage space occupied by the mapping table of metadata=virtual storage capacity/Grain space*8

For example, for a 2 T-byte virtual storage capacity, the mapping data table for metadata needs a storage space of 512M bytes. Thus, to store metadata using a mapping table, the storage space occupied by the mapping table is fixed with respect to the overall predetermined data storage space.

The valid data in the mapping table of metadata are fewer and sparse during the initial stage in use of a low-speed storage (for example, magnetic disk, magnetic tape, etc.), because most elements in the mapping table are not filled with data yet. With the use of the low-speed memory space, valid data in the mapping table will become increasingly dense. Whether the data are sparse or dense, the storage space occupied by the mapping table itself remains the same, and once established, the mapping relationships between addresses in the mapping table will not be deleted. Thus, the valid data in the mapping table increase continuously, but the storage space occupied by the mapping table is constant.

In contrast, in an existing storage system that supports the thin provisioning technology, the B-tree data structure of the metadata stored on the low-speed memory is a relatively small tree during the initial stage in use of the low-speed memory, which occupies less storage space. With the use of the low-speed storage space, the B-tree grows bigger and bigger and occupies more and more storage space.

Table 1 illustrates a storage space required by the mapping table and the B-tree corresponding to different valid data percentages. In this table, each node of B-tree has 512 entries, wherein the percentage of valid data represents the percentage of non-empty data in a mapping table to all data in the mapping table.

Accordingly, when a mapping table is used and the valid data percentage in the metadata is 50%, the stage space required by the B-tree data structure is the same as the storage space required by the data structure of the mapping table. Obviously, in this case, with the continuous growth of valid data, the storage space occupied by the B-tree data structure will be greater than the storage space occupied by the data structure of the mapping table. The 50 percentage is only an In view of the effect that metadata access has on IO access performance of a storage system supporting thin provisioning, the IO access performance may be improved by accelerating this access. It is well known that the access speed of a low-speed storage is too slow compared with that of the cache. Thus, an intuitive idea is to store metadata in the cache in runtime. Since the cache is a volatile storage, i.e., the stored content disappears after power off, it is necessary to store the metadata in the cache into a low-speed storage after the end of operation. However, a typical cache space is relatively small and thus can only accommodate a relatively small amount of metadata. In an existing storage system that supports the thin provisioning technology, performance may be accelerated by storing the B-tree data structure of all (when the storage space required by B-tree is small) or partial metadata (when the storage space required by the B-tree is large) in the cache. When the B-tree data structure of metadata occupies a large storage space, for the metadata that cannot be retrieved in the cache, it is necessary to access the metadata in the low-speed memory, which deteriorates the IO access efficiency in the storage system.

A cache may be provided for storing metadata to improve the access efficiency in a data storage system that includes thin provisioning. In one embodiment, the cache that stores metadata may use a Solid State Disk (SSD). Being different from a conventional low-speed memory, SSD is an electronic device instead of a physical mechanism arrangement, with characteristics of small size, low power consumption, strong anti-interference, extremely short addressing time (which even may be neglected), high IOPS, and high I/O performance, etc. A simple embodiment is to directly use the SSD to replace the low-speed memory to store the B-tree data structure of metadata.

SSD is a relatively expensive resource, and in the storage system, it is often used by other modules to improve the performance. SSD is generally required to be used economically, and the saved resources may be available to other modules for improving other access performances. Initially, the data are sparse, so the B-tree data structure may be used to store the metadata so as to reduce the storage space. However, when the data in the metadata become enough dense (namely, the valid data percentage reaches a predetermined threshold in case of using a mapping table structure), the space required for storing B-tree will be greater than the storage space that is required for storing the mapping table.

The present invention discloses a method of retrieving data in a storage system. The method may shorten the time spent by the storage system in retrieving and accessing data. The storage system supports the thin provisioning technology, and in this storage system, the establishing process of a mapping table of metadata mainly involves write operation in an IO by using a cache to store metadata.

Figure 3:
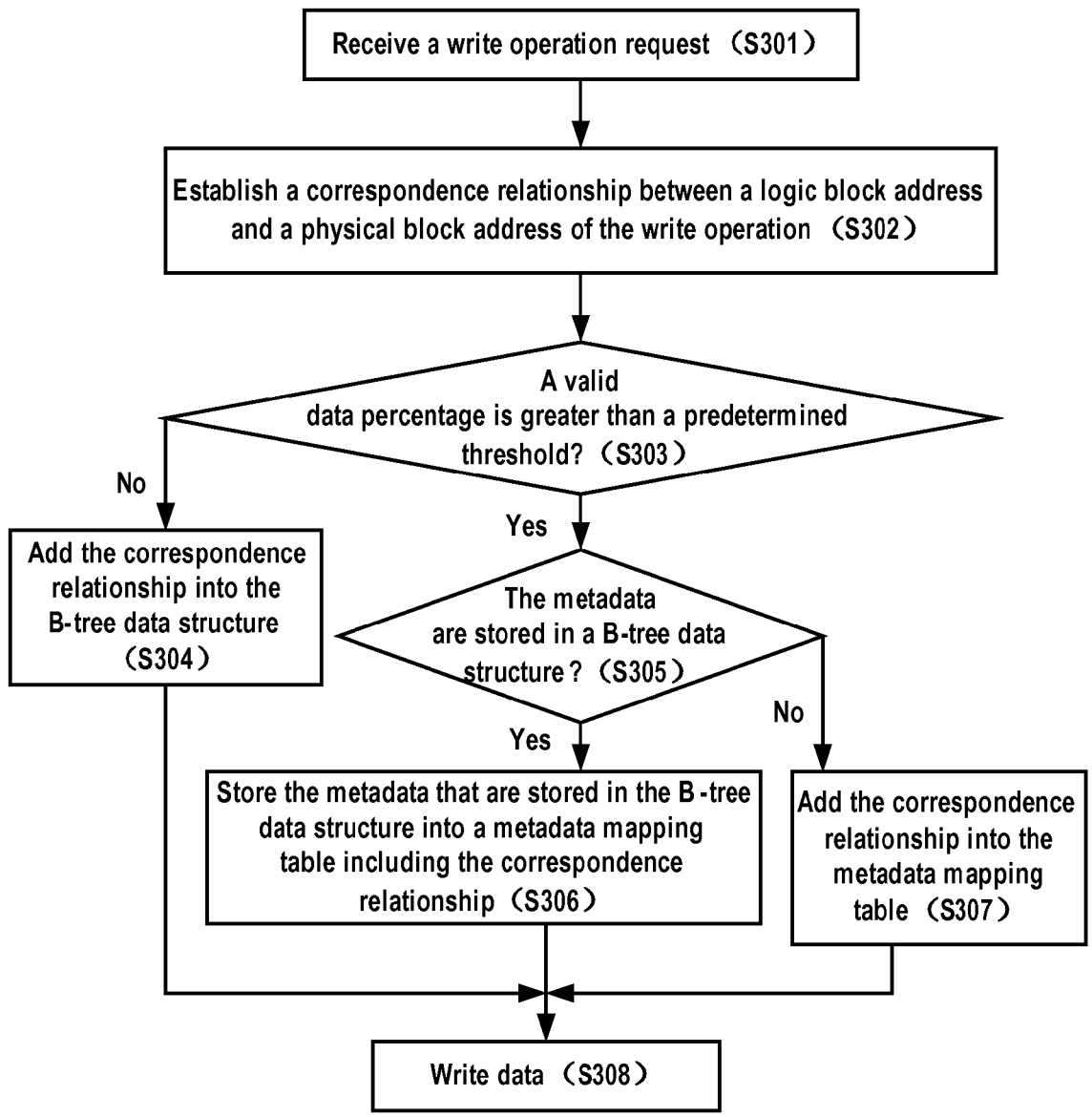
FIG. 3 illustrates a method flow of retrieving data in a storage system according to one embodiment of the present invention.

FIG. 3 illustrates the flow of this process. The method according to FIG. 3 comprises: at step S301, receiving a write operation request; at step S302, establishing a correspondence relationship between the logic block address and a physical block address of the write operation; at step S303, determining whether a valid data percentage that is calculated using a mapping table is greater than a predetermined threshold after the correspondence relationship is added into stored metadata; at step S304, in response to the valid data percentage that is calculated using a mapping table being not greater than the predetermined threshold, adding the correspondence relationship into a B-tree structure of the stored metadata; and then at step S308, writing at a physical block address of the correspondence relationship the data that the write operation request requires to write.

At step S305, in response to the valid data percentage that is calculated using the mapping table being greater than the predetermined threshold, determining whether the stored metadata are stored in a B-tree data structure; at step S306, in response to the stored metadata being stored in a B-tree data structure, storing the metadata that are stored in the B-tree structure into a mapping table of metadata that includes the correspondence relationship, and then the flow advances to step S308. At step S307, in response to the valid data percentage that is calculated using a mapping table being greater than the predetermined threshold and the stored metadata being not stored in the B-tree data structure, it is determined that the stored metadata are stored in a mapping table manner, and the correspondence relationship is added into the mapping table of metadata; and then the flow advances to step S308.

In one embodiment, in response to the mapping table of metadata being very large, the metadata may be divided into a plurality of parts, and each part may occupy a storage space of a same size or of a different size. Each part of the metadata is subjected to the method of FIG. 3. When calculating the valid data percentage, each part of the metadata may be processed as independent metadata, such that the valid data percentage is the valid data percentage that is calculated using a mapping table within this part of metadata.

In one embodiment, the cache for storing metadata is SSD. When the valid data in the mapping table are sparse, i.e., the valid data percentage is lower than a predetermined threshold, the B-tree structure of the metadata may be stored in the SSD, such that the saved space may be available to other modules for accelerating the performance; corresponding to each write operation, the newly established mapping relationship is inserted into the B-tree data structure of the metadata. Since the insertion operation of the B-tree data structure is well known to those skilled in the art, it will not be detailed here; when the valid data become dense, i.e., when the valid data percentage is greater than the predetermined threshold, the B-tree data structure of the metadata is spread into a mapping table, and the newly established mapping relationship is added into the mapping table and then stored into the SSD. Various algorithms are applicable for spreading the B-tree, which may be available in textbooks or algorithm set regarding data structure and are thus well known methods to the skilled in the art.

In this embodiment, if the metadata are divided into a plurality of parts, a mapping table of a plurality of parts of the metadata and the B-tree data structure of a part of metadata may be stored in the SSD. The mapping table that stores a plurality of parts of the metadata is established gradually through the method of FIG. 3. At this point, because the speed of cache is typically nearly 10 times higher than that of the SSD, the cache may be used as the cache for the metadata in the SSD. Therefore, if cache hit occurs, the IO speed may be improved. In a preferred embodiment, the cache is for buffering the B-tree data structure for a part of metadata; if there is extra cache space, it further buffers the mapping table for a plurality of parts of the metadata. If there is enough cache space, the B-tree data structure for the mapping table of a plurality of parts of the metadata may be established in the cache. However, it should be noted that enough space may be reserved for caching the client data; otherwise, the essential function of the cache will be lost, which will otherwise lower the access efficiency.

In a further embodiment, the high-speed memory that stores the B-tree data structure of the metadata is a cache, and the high-speed memory for storing the mapping tables of metadata is SSD. Because the cache is a volatile memory that will lose the stored information after power off, the B-tree data structure for the metadata must be stored in a low-speed storage and further maintain to be synchronous with the B-tree data structure for the metadata in the cache. The purpose for synchronization here is to still reserve relevant metadata when the cache is power off. Thus, the requirement on synchronization is not strict, which may be performed within a period of time after the cache is updated; or even, if the power source is sufficiently reliable, one synchronization is enough before the power off. Synchronization may be maintained by employing any existing manner of data synchronization or may be individually programmed. In a still further embodiment, other non-volatile memory may be employed to store the B-tree data structure and maintain the above synchronization with the B-tree data structure in the cache.

In these embodiments, when the valid data in the mapping table are sparse, i.e., the valid data percentage is lower than a predetermined threshold, the B-tree data structure of the metadata may be stored in the cache. Thus, not only the access efficiency is improved, but also the saved SSD space may be available to other modules to accelerate the performance. At this point, because the storage space occupied by the B-tree is small, the whole B-tree data structure of the current metadata may be stored in the cache; corresponding to each write operation, the newly established mapping relationship is inserted in the B-tree data structure of the cached metadata, and the B-tree data structure of the metadata as stored in the low-speed memory are synchronized. The synchronization here is identical to the synchronization as previously mentioned.

When the valid data in the mapping table become dense, i.e., if the valid data percentage using the mapping table structure is greater than the predetermined threshold for the first time, the synchronized B-tree data structure of the metadata in the low-speed memory is spread into the mapping table of metadata. This metadata comprise the correspondence relationship and migrated into the SSD for storage. At this point, the metadata in the cache are still stored in the B-tree data structure. If it is not the first time that the valid data percentage is greater than the predetermined threshold, then the mapping table of the metadata has been stored in the SSD. The mapping relationship may be added to the mapping table that is stored in the SSD. The subsequent application of cache may be determined by the space in the cache that is available to the metadata. If the space is large, the B-tree data structure of the metadata may be stored; if it is not so large, a partial mapping table of the metadata or partial B-tree data structure may be stored, etc.

In the just described embodiments, if the metadata are divided into a plurality of parts, it is possible to store the mapping table for a plurality of parts of the metadata in the SSD, store the B-tree data structure of a part of metadata in the cache, and meanwhile store in the low-speed memory the B-tree data structure that is synchronized with the B-tree data structure in the cache. The synchronization is identical to the previously mentioned synchronization. The mapping table that stores a plurality of parts of the metadata is established gradually through the method of FIG. 3. At this point, if the cache has extra space that can be used for storing metadata, it may further buffer the mapping table of the plurality of parts of the metadata, or if the cache space is more sufficient, the B-tree data structure for the mapping table of the plurality of parts of the metadata may be established in the cache. It should also be noted that enough space must be reserved for caching the client data; otherwise, the essential function of the cache will be lost, which will otherwise lower the access efficiency.

In the above embodiment, if the read time of the low-speed memory is 100 times the SSD read time and the SSD write time is three times the read time, for a 2 TB virtual storage capacity, when the Grain size is 32 K, the metadata on the SSD is 358 MB, the metadata on the SSD is 70% of all metadata, and the metadata in the cache is 30% of all metadata, the hit rate of the metadata in the cache is 50%; and for a storage system that comprises 70% read operation and 30% write operation, the average efficiency of IO access may be improved by 50%.

In the above embodiments, if the storage system receives a read request, the physical block address that is mapped by the logic block address of the read request may be obtained from the metadata, thereby reading the data from the physical block address.

In a preferred embodiment, in order to improve the efficiency of step S303 and step S305, a flag may be used to record whether the current metadata are stored in a B-tree data structure or in a mapping table data structure, and this flag is updated in response to the change of the storage manner of the current metadata. Moreover, a flag may also be used to record the storage location of each part of the metadata, and this flag is updated in response to the change of the storage location of each part of the metadata. The flag may even record the number of valid data in the current metadata and the number of all data in the mapping table of the current metadata, such that the new valid data percentage may be quickly calculated after the mapping table of metadata is added into the correspondence relationship.

Figure 4:
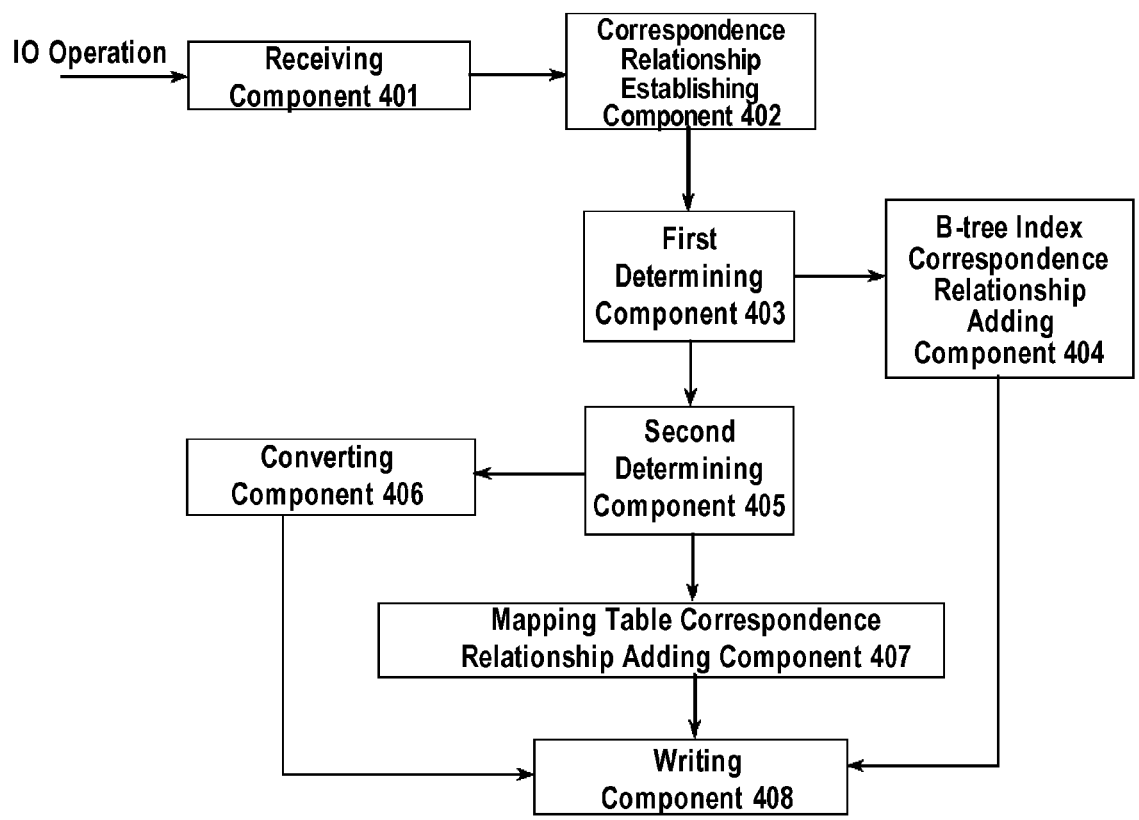
FIG. 4 illustrates a structure of an apparatus for retrieving data in a storage system according to one embodiment of the present invention.

With the same inventive concept, the present invention further provides an apparatus for retrieving data in a storage system. FIG. 4 illustrates a structure of this apparatus. The storage system supports the thin provisioning technology and uses a cache to store metadata. As illustrated in FIG. 4, this apparatus comprises: a receiving component 401 configured to receive a write operation request and a correspondence relationship establishing component 402 configured to establish a correspondence relationship between a logic block address and a physical block address of the write operation. A first determining component 403 may be configured to determine whether a valid data percentage that is calculated using a mapping table is greater than a predetermined threshold after stored metadata are added into the correspondence relationship. An B-tree index correspondence relationship adding component 404 may be configured to, in response to the valid data percentage that is calculated using a mapping table being not greater than the predetermined threshold, add the correspondence relationship into the B-tree data structure of the stored metadata; a second determining component 405 configured to, in response to the valid data percentage that is calculated using a mapping table being greater than the predetermined threshold, determine whether the stored data are stored in a B-tree data structure. A converting component 406 may be configured to, in response to the stored metadata being stored in a B-tree data structure, store the metadata that are stored in a B-tree data structure as a mapping table of metadata that comprises the correspondence relationship. A mapping table correspondence relationship adding component 407 may be configured to, in response to the valid data percentage that is calculated using a mapping table being greater than the predetermined threshold and the stored metadata being not stored in the B-tree data structure, determine that the stored metadata are stored in the mapping table manner and to add the correspondence relationship into the mapping table for the stored metadata. A writing component 408 may be configured to write at the physical address of the correspondence relationship data that the write operation request requires to write.

In one embodiment, if the mapping table of metadata is very large, the metadata may be divided into a plurality of parts, and each part may occupy a storage space of the same size or of a different size. For each part of the metadata, the first determining component determines whether the valid data percentage therein is greater than the predetermined threshold, and the valid data percentage that is calculated using a mapping table is the valid data percentage that is calculated using the mapping table within this part of metadata.

The apparatus of FIG. 4 may be added into the thin provisioning module 103 as illustrated in FIG. 1 to become a separate device within the module; it may also be external to FIG. 1 to become an independent device; or some modules in the apparatus of FIG. 4 may be added into some modules of FIG. 1, and some other modules may be added into other modules of FIG. 1. Those skilled in the art may know that various combination manners exist and they all fall within the protection scope of this invention.

In one embodiment, the cache for storing metadata is a SSD device. In this embodiment, the converting component may comprise: a spreading component configured to spread the B-tree data structure of the metadata in the SSD into a data structure of a mapping table; and a matrix data correspondence relationship adding component configured to add the newly established mapping relationship into the data structure of the mapping table.

In another embodiment, the high-speed memory for storing the B-tree data structure of the metadata may be a cache, and the high-speed memory for storing the mapping table of the metadata may be SSD device, and the B-tree data structure of the metadata is stored in the low-speed memory. This apparatus further comprises a synchronizing component configured to synchronize the metadata B-tree data structure that is stored in the low-speed memory with the metadata B-tree data structure that is stored in the cache. In this embodiment, the converting component may comprise: a spreading component configured to spread the metadata B-tree data structure in the low-speed memory into a data structure of a mapping table; a mapping table correspondence relationship adding component configured to add the newly established mapping relationship into the data structure of the mapping table; and a migrating component configured to migrate the mapping table obtained by the mapping table correspondence relationship adding component into the SSD device for storage.

Likewise, in order to improve the efficiency of the first determining component and the second determining component, a flag may be used to record whether the current metadata are stored in a B-tree data structure or in a mapping table data structure, and the flag is updated with change of the storage manner of the current metadata. Moreover, a flag may also be used to record the storage location of each part of the metadata, and this flag is updated in response to the change of the storage location of each part of the metadata.

Though the exemplary embodiments of the present invention are described herein with reference to the drawings, it should be understood that the present invention is not limited to these embodiments, and a person of normal skill in the art can carry out various kinds of modifications to the embodiments without departing from the scope and principle of the present invention. All such variations and modifications are intended to be included in the scope of the present invention as limited in the appended claims.

Moreover, based on the above description, the skilled in the art would appreciate that the present invention may be embodied as an apparatus, a method, or a computer program product. Thus, the present invention may be specifically implemented in the following manners, namely, full hardware, full software (including firmware, resident software, microcode, etc.), or a combination of software part and hardware part as generally called "circuit," "module," or "system" in this specification. Further, the present invention may adopt a form of computer program product as embodied in any tangible medium of expression, the medium comprising computer-readable program code.

Any combination of one or more computer-usable or computer-readable mediums may be used. The computer-usable or computer-readable medium may be for example, but not limited to, electrical, magnetic, optical, electromagnetic, infrared, or semiconductor system, component, device, or propagation medium. More specific examples (non-exhaustive list) of the computer-readable medium comprise the following: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, a transmission medium for example supporting internet or intranet, or a magnetic storage device. It should be noted that the computer-usable or computer readable medium may even be a paper or other suitable medium printed with a program thereon, because the program may be obtained electronically by electrically scanning such paper or other medium, and then compiled, interpreted or processed in a suitable manner, and if necessary, stored in a computer memory. In the context of the present document, a computer-usable or computer-readable medium may be any medium containing, storing, communicating, propagating, or transmitting a program available to an instruction execution system, apparatus or device, or associated with the instruction execution system, apparatus, or device. A computer-usable medium may comprise a data signal contained in a base band or propagated as a part of carrier and embodying a computer-usable program code. A computer-usable program code may be transmitted by any suitable medium, including, but not limited to, radio, wire, cable, or RF, etc.

A computer program code for executing operation of the present invention may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

Further, each block in the flow charts and/or block diagrams and combination of each block in the flow charts and/or block diagrams of the present invention may be implemented by computer program instructions. These computer program instructions may be provided to a processor of a utility computer, a dedicated computer or other programmable data processing apparatus, to thereby generating a machine such that these instructions executed through the computer or other programmable data processing apparatus generate component for implementing functions/operations prescribed in the blocks of the flow charts and/or block diagrams.

These computer program instructions may also be stored in a computer-readable medium capable of instructing the computer or other programmable data processing apparatus to work in a particular manner, such that the instructions stored in the computer-readable medium generate a product including instruction component for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

The flowcharts and block in the figures illustrate the system, methods, as well as architecture, functions and operations executable by a computer program product according to the embodiments of the present invention. In this regard, each block in the flowcharts or block may represent a module, a program segment, or a part of code, which contains one or more executable instructions for performing specified logic functions. It should be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

What is claimed is:

1. A method for retrieving data in a storage system, the method comprising:
   receiving a write operation comprising a correspondence relationship between a logic block address and a physical block address of the write operation, wherein the correspondence relationship is added to stored metadata;
   determining whether a valid data percentage is greater than a predetermined threshold;

in response to the valid data percentage being less than the predetermined threshold, adding the correspondence relationship to a B-tree data structure of the stored metadata;

in response to the valid data percentage being greater than the predetermined threshold, determining whether the stored metadata are in the B-tree data structure;

writing data associated with the write operation at the physical block address; and in response to the valid data percentage being greater than the predetermined threshold and the stored metadata being not stored in the B-tree data structure, determining that the stored metadata are stored in a mapping table and adding the correspondence relationship to the mapping table.

2. The method according to claim 1, wherein the valid data percentage is calculated using a mapping table, and in response to the stored metadata being in the B-tree data structure, the method further comprises storing the stored metadata in the mapping table.

3. The method according to claim 1, wherein the storage system supports thin provisioning, and the metadata is a part of metadata in a low-speed storage component supporting the thin provisioning.

4. The method according to claim 1, wherein the storage system stores the metadata in a high-speed storage component.

5. The method according to claim 4 further comprising, in response to the valid data percentage being greater than the predetermined threshold, storing the B-tree data structure of the metadata in a mapping table and adding the correspondence relationship to the mapping table.

6. The method according to claim 5, wherein the storage system stores the metadata in a cache, the mapping table in a high-speed storage, and the B-tree data structure in a low-speed storage.

7. The method according to claim 6 further comprising, in response to the valid data percentage being greater than the predetermined threshold, storing the B-tree data structure of the metadata in the low-speed memory as a mapping table, the mapping table including the correspondence relationship.

8. The method according to claim 1, wherein a storage format of the metadata is indicated by a flag, the storage format comprises at least one of a B-tree data structure and a mapping table, and the flag is updated in response to a change of the storage format.

9. The method according to claim 8, wherein the flag is updated in response to a change of a storage location of the metadata.

10. An apparatus for retrieving data in a storage system, the apparatus comprising:
a receiving component configured to receive a write operation;
a relationship establishing component configured to establish, for the write operation request, a corresponding relationship between a logic block address and a physical block address of the write operation;
a first determining component configured to determine whether a valid data percentage is greater than a predetermined threshold;
a relationship adding component configured to, in response to the valid data percentage being less than the predetermined threshold, add the correspondence relationship to a B-tree data structure of the stored metadata;
a second determining component configured to, in response to the valid data percentage being greater than the predetermined threshold, determine whether the stored metadata are stored in the B-tree data structure;
a writing component configured to write data associated with the write operation at the physical block address; and
a relationship adding component configured to, in response to the valid data percentage being greater than the predetermined threshold and the stored metadata being not stored in the B-tree data structure, determine that the stored metadata are stored in a mapping table, and add the correspondence relationship to the mapping table.

11. The apparatus according to claim 10, wherein the valid data percentage is calculated using a mapping table, and the apparatus further comprises a converting component configured to, in response to the stored metadata being stored in the B-tree structure, store the metadata in the mapping table.

12. The apparatus according to claim 11, wherein the converting component comprises:
a storing component configured to store the B-tree data structure of the metadata in the mapping table; and
a matrix data correspondence relationship adding component configured to add the correspondence relationship to the mapping table.

13. The apparatus according to claim 11, wherein the converting component comprises:
a mapping table correspondence relationship adding component configured to add a mapping relationship to the mapping table; and
a migrating component configured to migrate the mapping table to a SSD device for storage.

14. The apparatus according to claim 10, wherein the storage system supports thin provisioning technology, and the metadata are stored in a low-speed storage.

15. The apparatus according to claim 10, wherein the storage system stores the metadata in a cache, the mapping table in a high-speed storage, and the B-tree data structure in a low-speed storage; and the apparatus comprises a synchronizing component configured to synchronize the B-tree data structure of the metadata stored in the low-speed memory with the B-tree data structure of the metadata stored in the cache.

16. The apparatus according to claim 10, wherein a flag is used for recording a storage format of current metadata, the storage format comprising at least one of a B-tree data structure and a mapping table, and the flag is updated in response to a change of the storage format.

17. A computer program product executed by a processor device for retrieving data in a storage system, the computer program product comprising a non-transitory computer readable storage medium having computer readable program code embodied therewith, the computer readable program code comprising:
computer readable program code configured to receive a write operation comprising a correspondence relationship between a logic block address and a physical block address of the write operation, wherein the correspondence relationship is added to stored metadata;
computer readable program code configured to determine whether a valid data percentage is greater than a predetermined threshold;
computer readable program code configured to, in response to the valid data percentage being less than the predetermined threshold, add the correspondence relationship to a B-tree data structure of the stored metadata;
computer readable program code configured to, in response to the valid data percentage being greater than the predetermined threshold, determine whether the stored metadata are in the B-tree data structure;

computer readable program code configured to write data associated with the write operation at the physical block address; and computer readable program code configured to, in response to the valid data percentage being greater than the predetermined threshold and the stored metadata being not stored in the B-tree data structure, determine that the stored metadata are stored in a mapping table, and add the correspondence relationship to the mapping table.

18. The apparatus according to claim 17, wherein the storage system supports thin provisioning technology, and the metadata are stored in a low-speed storage.

* * * * *